C. W. GRAHAM.
METHOD OF CUTTING AND HANDLING CAN END LINERS.
APPLICATION FILED JULY 18, 1916.
1,355,040.
Patented Oct. 5, 1920.
8 SHEETS—SHEET 3.
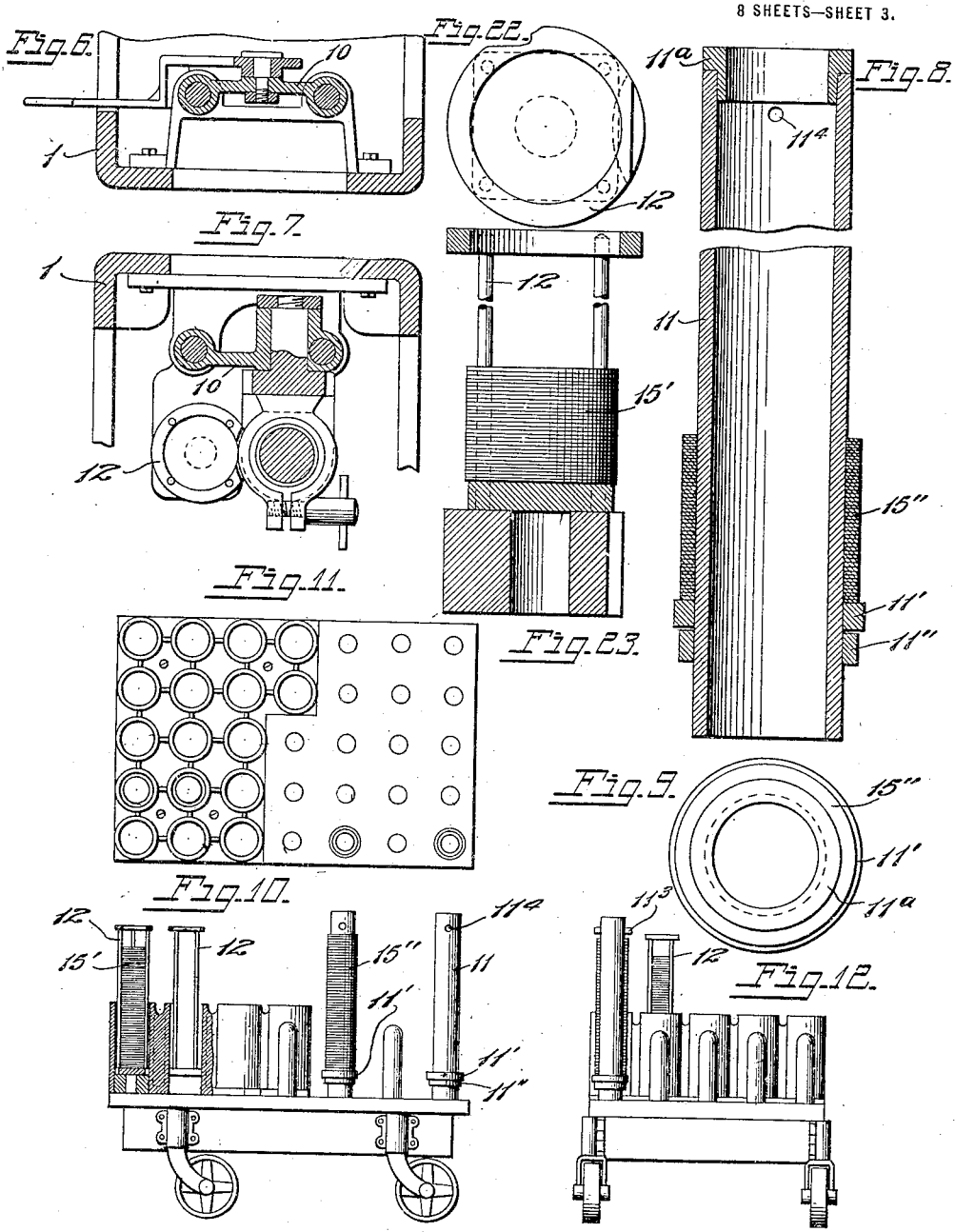
WITNESSES:
Marshall Low
INVENTOR
Charles W. Graham
BY
H. N. Low
ATTORNEY C. W. GRAHAM.
METHOD OF CUTTING AND HANDLING CAN END LINERS.
APPLICATION FILED JULY 18, 1916.

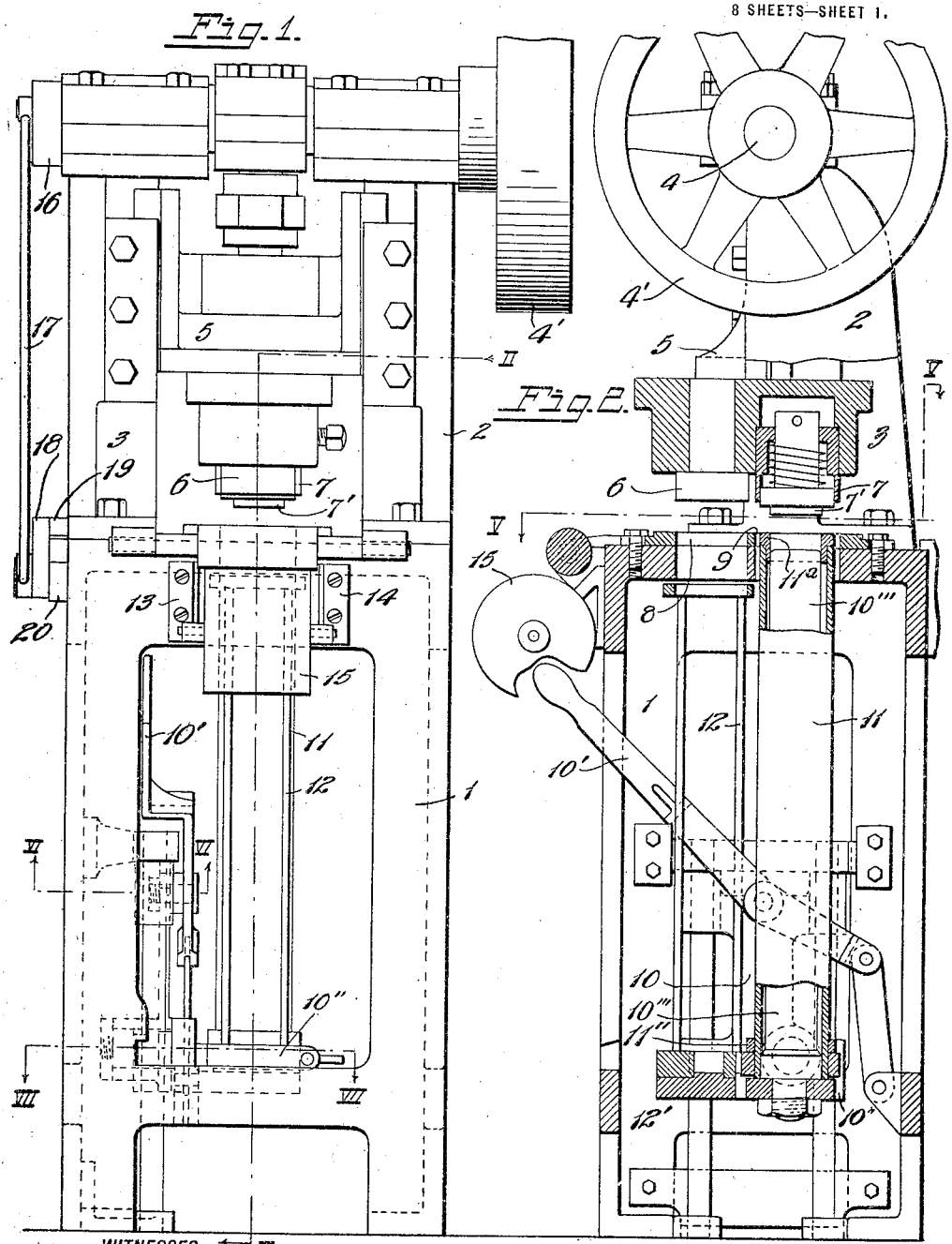

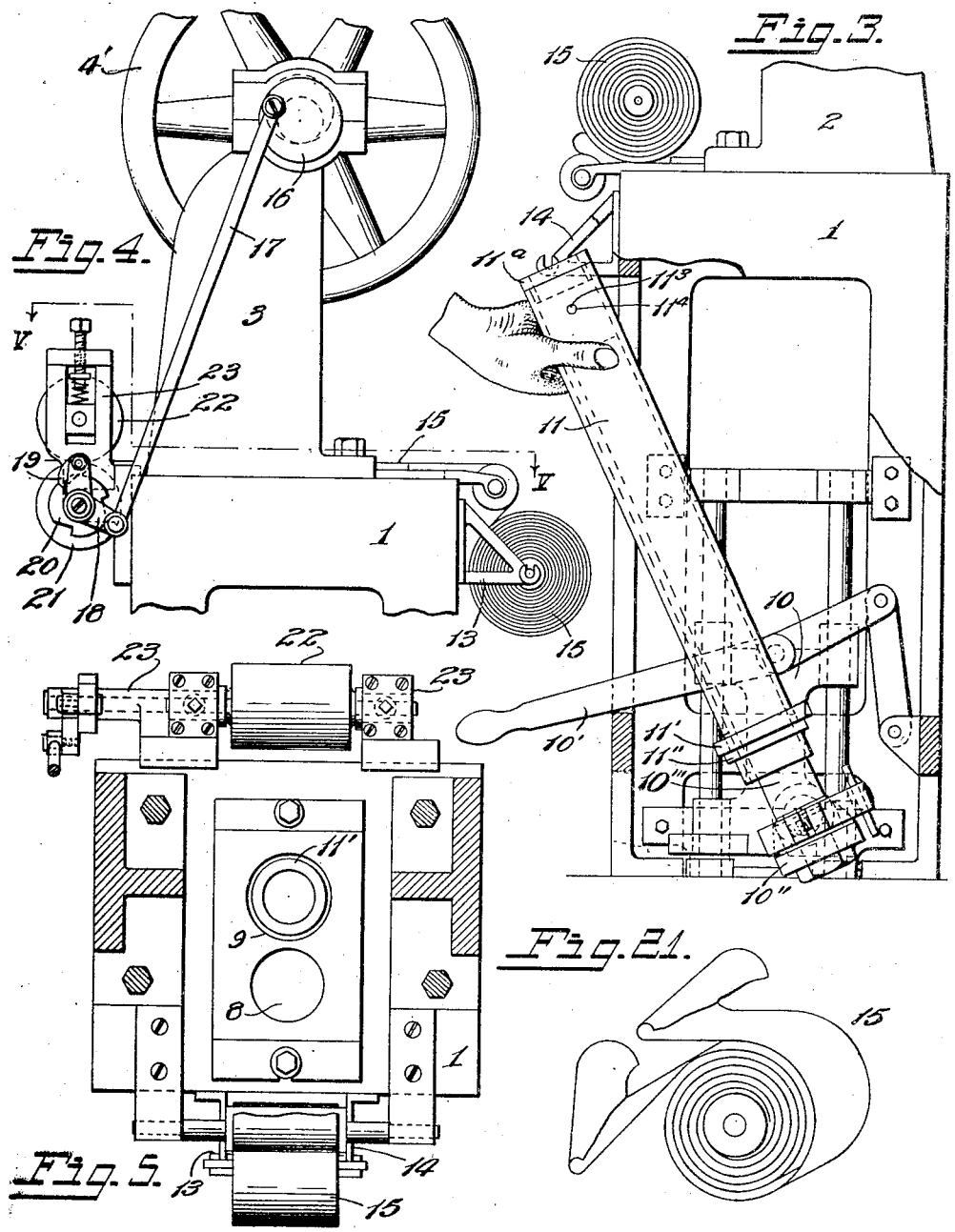

1,355,040.

Patented Oct. 5, 1920.
8 SHEETS—SHEET 4.

WITNESSES:
Marshall Low

INVENTOR
Charles W. Graham
BY H. N. Low
ATTORNEY

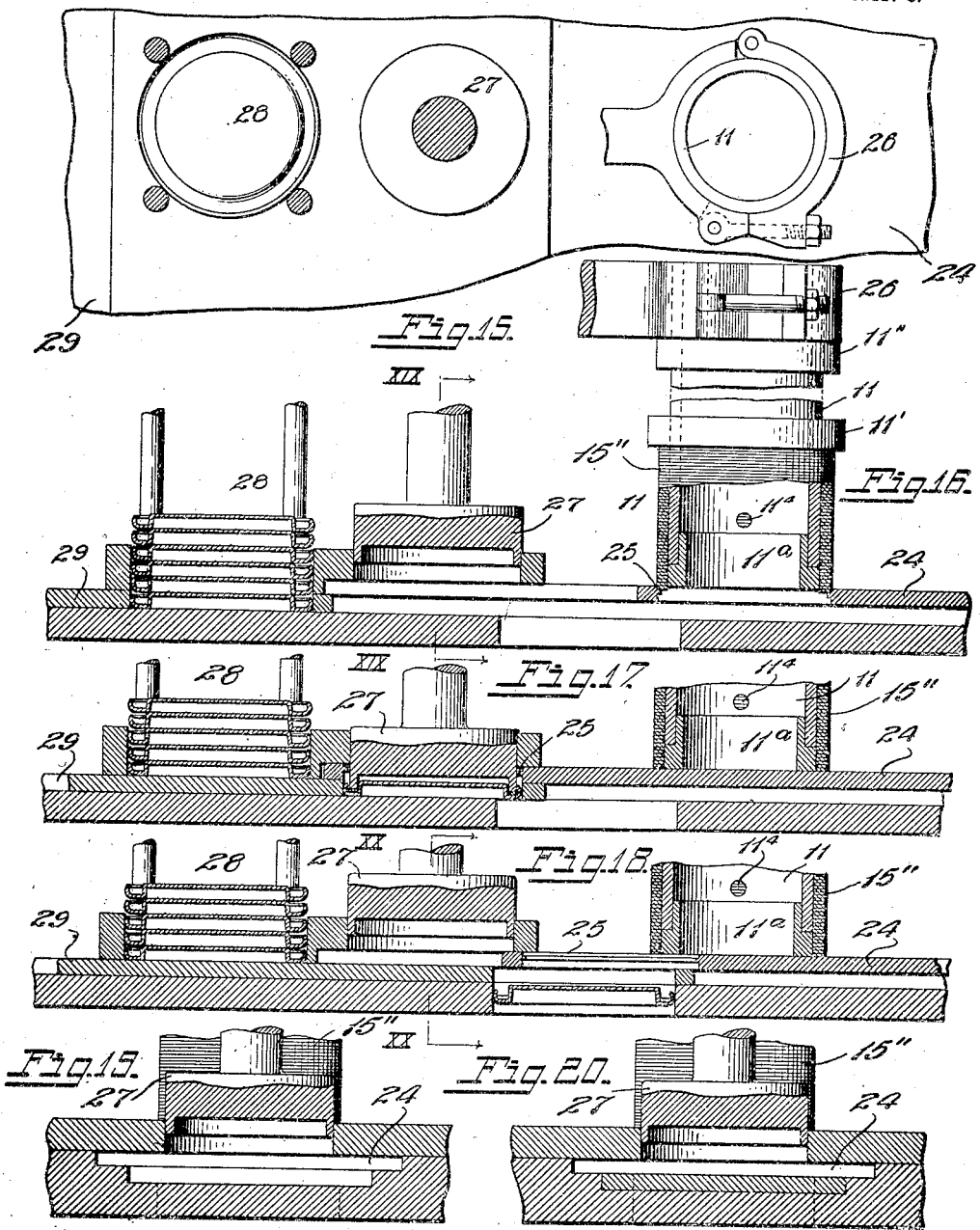

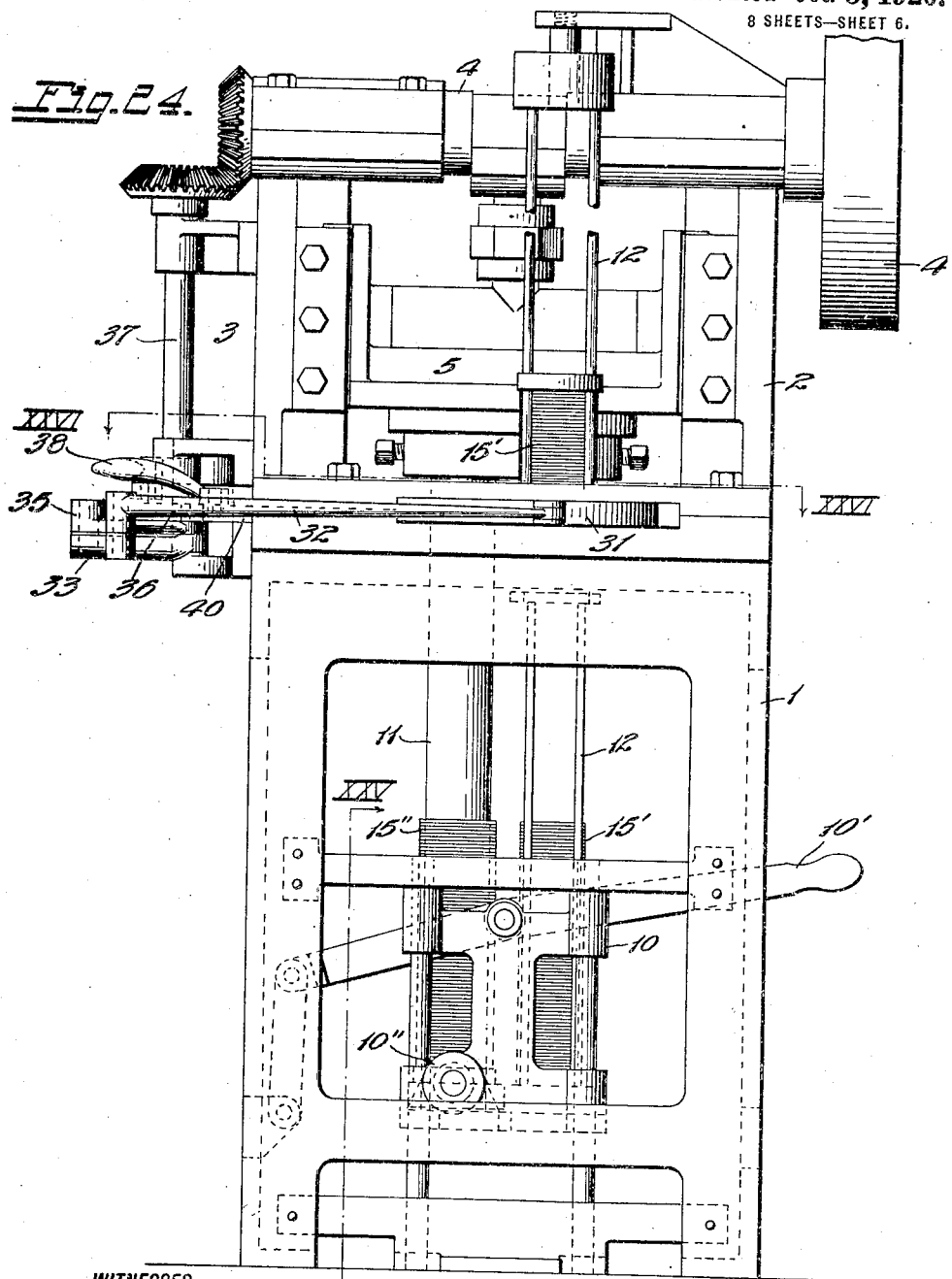

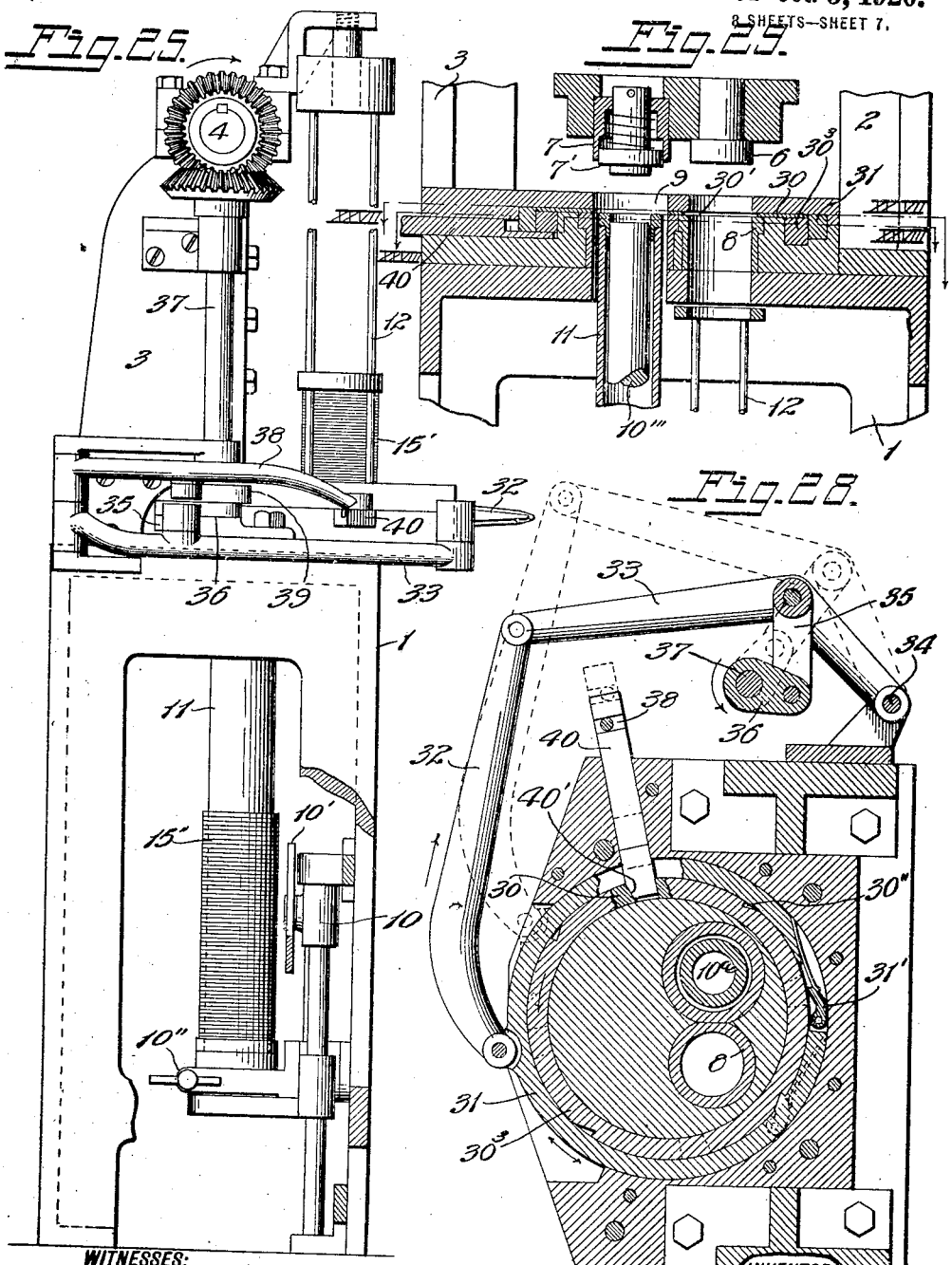

C. W. GRAHAM.
METHOD OF CUTTING AND HANDLING CAN END LINERS.
APPLICATION FILED JULY 18, 1916.
1,355,040.
Patented Oct. 5, 1920.
8 SHEETS—SHEET 8.
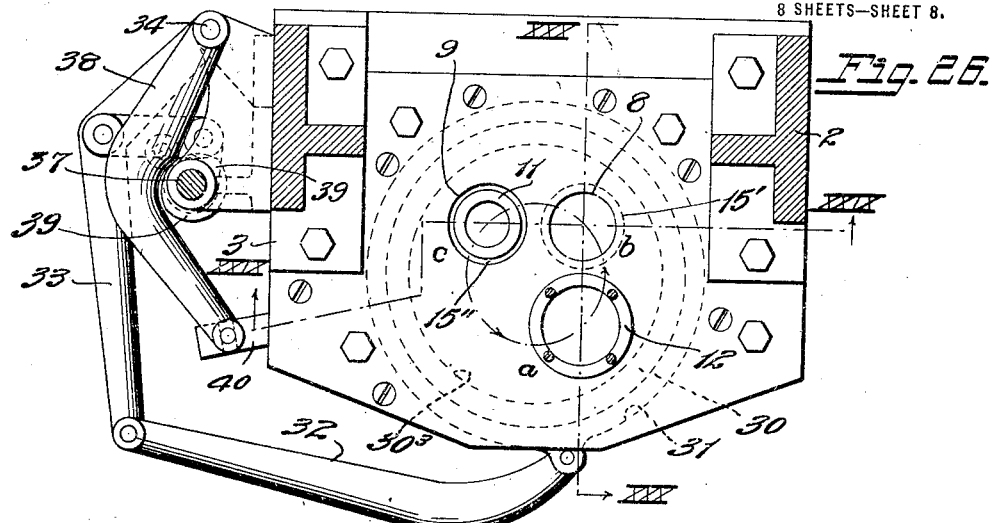
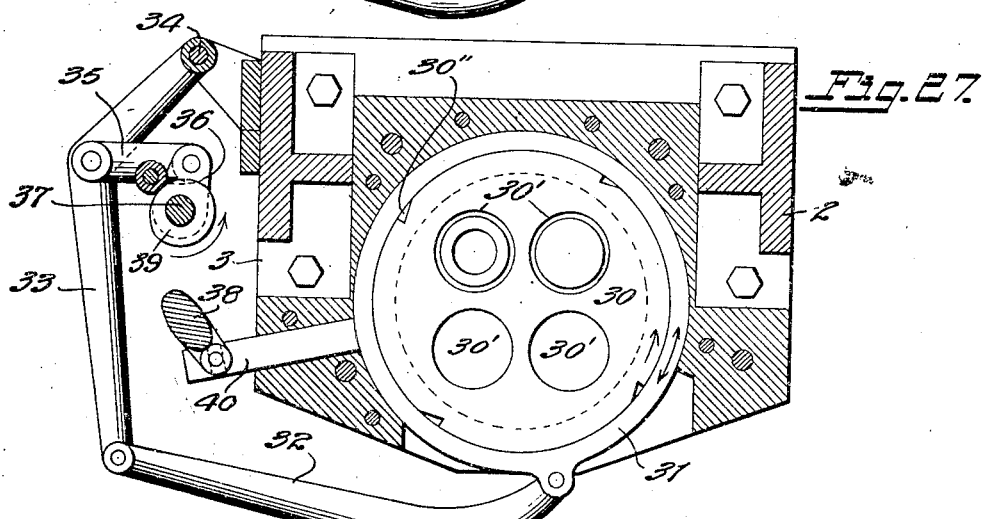
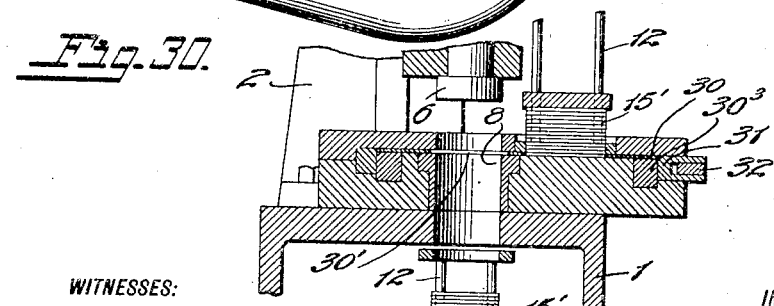
WITNESSES:
INVENTOR
Charles W. Graham
BY
N. N. Loew
ATTORNEY

UNITED STATES PATENT OFFICE.

CHARLES W. GRAHAM, OF CRESTWOOD, NEW YORK, ASSIGNOR TO AMERICAN CAN COMPANY, OF NEW YORK, N. Y., A CORPORATION OF NEW JERSEY.

METHOD OF CUTTING AND HANDLING CAN-END LINERS.

1,355,040.　　　　　Specification of Letters Patent.　　　Patented Oct. 5, 1920.

Application filed July 18, 1916. Serial No. 109,943.

*To all whom it may concern:*

Be it known that I, CHARLES W. GRAHAM, a citizen of the United States, residing at Crestwood, in the county of Westchester and State of New York, have invented certain new and useful Improvements in Methods of Cutting and Handling Can-End Liners, of which the following is a specification.

The invention relates to a method of cutting and handling can end liners in bulk, previous to applying them to can ends; and handling gasket material in the shape of core disks, cut from the centers of the liners.

In the manufacture of food containers, known in the trade as "sanitary cans," the bodies, tops and bottoms are made separately by independent and different mechanism, after which operation the bottom is attached to the body by an interfolded double seam, at the can factory. The tops and bodies with bottoms attached, are then shipped separately to the canning factory where the cans are filled with product, and the tops or covers are applied by a special machine. In applying the bottoms and covers it is necessary in many instances that the interfolded or interlocked double seam be rendered hermetic during the closing, so that the contents are hermetically confined during the future processing, handling, storing and shipping.

The hermetic closing in this type of can is generally accomplished by incorporating a lining gasket of suitable material into and between the folds of the interfolded double seams, joining the ends to the bodies. One of the appliances of this sort, that is coming into quite extensive use, is a gasket or lining made of a suitably prepared fibrous paper. The paper is supplied in rolls or webs of suitable length and width, and is automatically carried through cutting and lining machines, where core pieces or disks are cut from the web and discharged, and lining rings or gaskets cut from the core openings and applied to suitably positioned can ends, the applying being by parts of the liner cutting mechanism or by special assembling mechanism; in any event, the cut liner is quite flexible and very light in weight and it is essential that it be mechanically controlled from the instant it is cut until it is applied to the flange of the can end. The core pieces cut from the web and discharged into a stacking chute are utilized from which to cut other liners for smaller diameter can ends.

In many of the machines now in use for cutting liners and lining can ends, the cutting and applying of the liner to a can end is done in the same machine, as successive operations.

The object of this invention is to provide a method whereby can end liners or gaskets are cut from a web, or from core pieces previously cut from a web, and a large number of them assembled in stack units, whereby they may be easily handled, stored or transported to machines for applying the liners singly to the flanges of can ends.

The method comprises the steps of cutting liners from suitable material, depositing the cut liners onto suitable carriers, in stack formation, transporting the stacks to lining machines where they are inserted as units, into liner feeding mechanism, or transporting the stacks to storage for future use.

This invention opens the way for a more sanitary, systematic and economical method of cutting and applying liners to the flanges of can ends.

In cutting gaskets from paper or like substances considerable dust and lint is liberated, which floats through the air, settles on all the machinery and is also inhaled to some extent by the employees in the room. By this method the gasket cutting would be confined to a separated and isolated cutting room where only a few employees would be subjected to the dust, and the cut liners transported to the liners in a lining room.

The operation of cutting and lining are two distinct and widely different operations, and when combined in one machine often produce complication, and require expert and skilled operators, while if the operations are carried on separately with specially designed machines for performing each operation, simpler machines are employed and higher efficiency of operation obtained.

At the same time that the liners are cut and assembled on the stack cores, the centers or core disks first cut from the web are dropped into a stack chute and thereby assembled in stack formation for conveying to lining machines that operate on disk blanks for cutting ring liners, or to cutting presses for cutting individual rings from the disks. I have shown two types of machines in the drawings, one operating on a web of gasket material, and the other operating on the disk blanks cut from the web.

It is also practical and possible to cut liners from tube material and deposit the cut liners onto a core in stack formation, the only change in the machine being in the gasket material feed mechanism, and the cutting mechanism. I, therefore, do not wish to confine my method to any particular type of machine, but consider that it is applicable to any type of machine wherein liners are cut and assembled in multiple for handling and conveying to lining machines.

In order to maintain the cut liners in stack formation and permit of easy handling without displacement, they are automatically assembled on a metal, paper or wood core as they are cut; this core is of light, simple and cheap construction so that a sufficient quantity can be provided for constant operation of a number of machines.

For packing certain kinds of goods it might be desirable and necessary to treat the cut liners in some manner before applying them to the can ends to render them water resistant, so that their coming in contact with liquid contents of a filled can would not affect their sealing capacities or their placement in the interfolded joint while being secured to the can. It might be desirable that the liners be given highly absorbtive properties just before being applied to the can ends, which could easily be accomplished by subjecting the stack units to a heating or drying out operation; such drying out would render the individual liners crisp and snappy, so that they would feed readily in the lining machines and resist deformation much better than if they contained some atmospheric moisture.

To illustrate my method as applied to cutting and assembling can end liners for convenient and safe handling I append herewith a set of drawings showing a specially designed full automatic cutting press, that works continuously without attention, until a complete stack of liners and core pieces are assembled, when the operator removes the stacks as units and places them on transporting trucks or in storage. After removal of completed stacks and the replacement of empty stack holders, the press continues its action and assembles other stacks, thus enabling one operator to attend a number of cutting machines.

The core pieces or center disks cut from the web just previous to cutting the liners are stacked and handled in a similar manner to the stacks of liners. These core pieces are valuable gasket or liner material and are utilized to cut liners from for smaller diameter can ends. The same type of machine as illustrated herewith is suitable for handling these disks and cutting ring liners therefrom. The only change necessary being a disk feed mechanism instead of a web feed mechanism, that will deliver single disks from the stack.

Machines are now employed for cutting the outer edges from core pieces to form new disks of a diameter equaling the outer diameter of a smaller can end liner, and these disks are then automatically fed, singly, to combined cutting and lining machines where a core piece is cut therefrom leaving a ring liner for attachment to a can end. By my method disks of this character are utilized in a battery of graduated machines, starting with a large disk, cutting liners and core pieces therefrom, using these core pieces in the next smaller machine cutting liners of less diameter, and core pieces therefrom, using these core pieces in the next smaller machines likewise, until the core pieces are entirely used up and liners of gradually receding diameters are produced from this core material. Each of the machines in this battery of cutting machines would cut liners and core pieces and assemble each in stack formation to be handled in exactly the same manner as the liners and core pieces shown by the drawings herewith.

Another important feature of this method of cutting, assembling and handling can end liners lies in the possibility of cutting two or more core pieces or can end liners with the same pair of cutting elements by simply feeding two or more superposed webs of gasket or liner material between the dies. In this manner one gasket cutting press, would have sufficient capacity to supply two or more can end lining machines, thereby reducing the number of cutting machines required for a given output and reducing the cost of production. The only addition necessary to the feeding device shown in the drawings would be extra roll holders for the liner material; the separate webs would pass under the cutting dies lying in superposed position in exactly the same manner as the single web shown, or without any change at all, superposed rolls could be used where two or more webs would be superposed and wound into one roll and fed through the machine with the mechanism shown.

In the drawings:

Figure 1 is a front elevation of a liner cutting and stack assembling press.

Fig. 2 is a vertical section on line II—II of Fig. 1, showing a stack core in position underneath the liner die and a stack chute for the core pieces cut from the web previous to cutting the liner; in place under the core die.

Fig. 3 is a vertical sectional elevation on the same line as Fig. 2 showing the base of the machine and showing the liner stack core tipped out for removal or replacement.

The roll of gasket material has been lifted up and laid on the bed of the machine to permit easy removal of the liner stack.

Fig. 4 is a side elevation of the top part of the machine showing the mechanism for feeding the paper web through the machine as the cores and liners are cut.

Fig. 5 is a plan section on line V—V of Fig. 2 showing the core and liner dies in their working positions.

Fig. 6 is a plan section on line VI—VI of Fig. 1, showing a detail of the carriage mechanism for raising and lowering the liner stack core and core chute into and out of position relative to the dies.

Fig. 7 is a similar plan section of Fig. 6 taken on line VII—VII of Fig. 1 showing a detail of the lower part of the carriage mechanism.

Fig. 8 is a detail sectional elevation of a liner stack core showing its construction and showing a quantity of liners placed thereon.

Fig. 9 is a plan of Fig. 8.

Fig. 10 is a side elevation of a transporting truck for conveying stack units to operating machines or to storage.

Figs. 11 and 12 are respectively a plan view and end elevation of the transporting truck.

Figure 13:
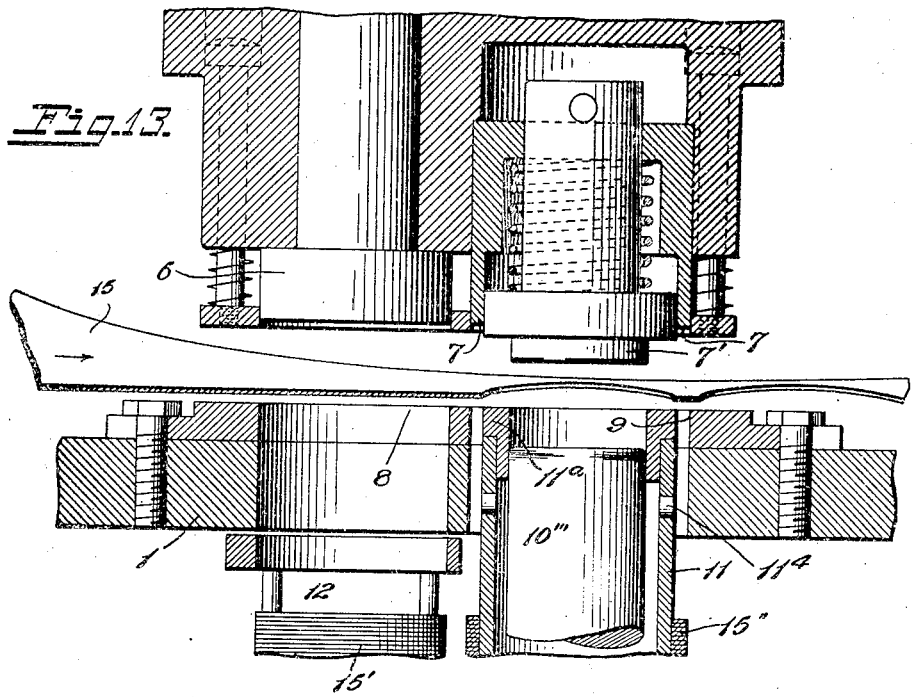

Fig. 13 is an enlarged sectional view of the die cutting mechanism showing clearer than the smaller views, the exact relation of the dies and stack containers and the strip of gasket material; the strip has just been fed forward and is in position for cutting a center disk out by the punch 6 and die 8, and a ring liner by the punch 7 and die 9. The stack core 11 is here shown positioned concentric with the die 9 so that the pilot 7' will enter its mouth and hold it central while the ring is cut and left deposited around the core 11.

Figure 14:
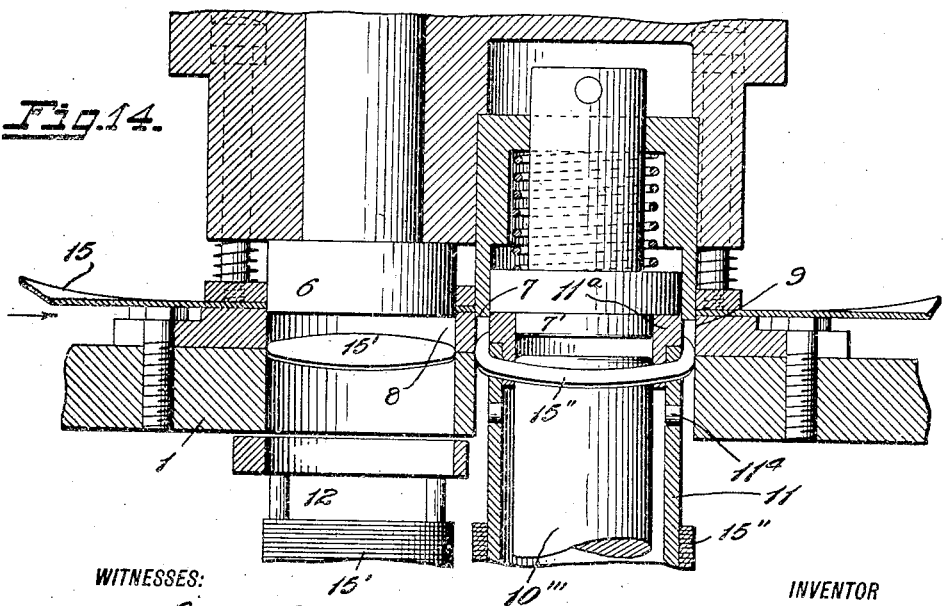

Fig. 14 is a similar view showing the cutting punches 6 and 7 in their lower positions, having cut a center disk and a ring liner and left them in their respective stack receptacles.

Figs. 15 to 20 inclusive show parts of a lining machine, illustrating particularly just how a stack of can end liners is held in stack formation by means of the core 11, and is handled and inserted into the feed mechanism of a lining machine, whereby individual liners are automatically stripped from the stack and alined with a can end and then assembled therewith.

Fig. 15 shows a plan view of the clamp for holding the stack core 11 in an inverted position, and a plan of a can end chute and the assembling means.

Fig. 16 is a vertical sectional view showing the inverted stack 11 in operative relation with a movable liner feed member, the assembling plunger and the stack of can ends and the feed member for the can ends.

Fig. 17 is a similar sectional view to Fig. 16 but showing the liner feed member and the can end feed member each advanced into alinement with the assembling plunger, and the assembling plunger having moved the liner through the orifice of the feed member onto the flange of the can end.

Fig. 18 is a similar sectional view to Fig. 17 showing the liner feed member returning and the can end feed member discharging the lined can end.

Figs. 19 and 20 are sectional views on lines XIX—XIX and XX—XX of Figs. 16 and 18 showing the guideways for the slide members feeding the can ends and liners.

Fig. 21 shows the manner of rolling two strips of gasket material in superposed relation into a single roll, whereby they may be passed between the cutting dies in superposed position and two core disks and ring liners cut at one stroke of the cutting elements.

Figs. 22 and 23 show respectively a plan and sectional side view of the disk blank stack chute or holder.

Fig. 24 is a front elevation of the machine arranged for automatically feeding disk blanks from an inverted core stack for cutting smaller cores and ring liners and assembling them into stack formation, the same as when cut from a strip or web.

Fig. 25 is a side elevation of Fig. 24.

Fig. 26 is a sectional plan taken on line XXVI—XXVI of Fig. 24 showing the relation of the various parts of mechanism for operating the feed means for feeding the disk blanks.

Fig. 27 is a similar section plan to Fig. 26 but taken on line XXVII—XXVII of Fig. 29 showing the parts in the same positions as in Fig. 26 but more in detail.

Fig. 28 is a similar view to Fig. 27 but taken on line XXVIII—XXVIII of Fig. 29, showing the parts in full lines in the same positions as Figs. 26 and 27 and showing an extreme position in dotted lines.

Fig. 29 is a vertical sectional view taken on line XXIX—XXIX of Fig. 26 showing the stack holders and cutting dies in their normal working positions.

Fig. 30 is a vertical sectional view taken on line XXX—XXX of Fig. 26 showing the relation of the disk stack and the perforating punch.

I have referred particularly to cutting liners from paper or like material. Paper or such fibrous material is, however, only one of the many materials suitable for gaskets or liners for can ends. Rubber compositions have been used for many years. Such material as cellulose compounds, rendered somewhat flexible and yielding by admixture with softening agents, such for instance as acetic acid compounds of cellulose, similar to cellulose acetate in colloidal form, which may be produced by partial acetylization of the original cellulose material; also compositions of gelatin or other albuminous matter rendered pliable by a suitable softening agent such as glycerin, are entirely suitable for the purpose, as long as they will fold into the double seam without cracking or checking. Thin sheet metal of a soft and yielding nature, such for example as tin foil, is also suitable for lining can ends.

It is possible to impregnate cloth with suitable surfacing material so as to render it available for gaskets. I, therefore, wish to extend my method of handling can end liners in multiple, to the use of any material from which can end liners can be made.

Referring to the drawings:

A housing 1 carries bearing members 2 and 3; the memberes 2 and 3 are bolted on top of the housing 1 in spaced relation, with shaft bearings and crosshead bearings arranged to carry a main driving crank shaft 4 and a crosshead 5. The crosshead 5 carries a core punch 6 and a liner or gasket punch 7. Mounted on the top of the bed 1 is a companion core die 8 and a liner or gasket die 9. Mounted in the base of the housing 1 is a manually operated crosshead 10 carrying supports for maintaining the liner or gasket stack cores 11 and the center disk chutes 12 in proper relation to the cutting dies 8 and 9; the crosshead 10 is manipulated with the hand lever 10'. A fly wheel 4' serves to transmit motion to the crosshead 5. A roll of paper or other suitable web gasket material 15 is mounted on brackets 13 and 14 and is intermittently moved between the cutting dies by suitable feed mechanism comprising a crank disk 16 on the end of shaft 4, a rod 17 connecting with a rocker arm 18, pawl 19 and ratched 20, and operating feed rolls 21 and 22 carried in suitable housings 23.

The tubular liner stack member 11 sits in a hinged socket 10'' in the base of the crosshead 10 and is supported in a rigid vertical position by means of a supporting post 10''' which extends up inside the entire length of the member 11 and has a bearing in the steel collar 11ª in the top of the member 11; this post is rigid and tends to hold the upper end of the member 11 concentric with the pilot 7' carried by the punch 7. The combined supporting effect of the post 10''' and the pilot 7' will keep the upper end of the stack member 11 in perfect alinement with the ring or liner 15'' as it is cut and placed on the stack member 11, and it is thereby held in a normally vertical position. This hinged socket member 10'' is necessary to enable easy removal and replacement of the stack member 11, (see Fig. 3); the core chute 12 can be lifted vertically out of its supporting socket 12' and removed without a hinged base. The operation of the machine illustrating this method of cutting and handling can end liners would be as follows: With the hand lever 10' depressed as in Fig. 3, the crosshead 10 is placed in its lowermost position enabling the easy placement of a liner stack member 11, constituting a transfer core or mandrel. It is necessary to tilt the stack member 11 outward to be removed or placed in the machine, on account of the centering post 10''' extending through nearly its full length. Fig. 3 shows it just being passed down to position over the post 10''' by the hand of the operator. When it is fully seated it is moved to a vertical position; then the core disk chute 12 is placed in its position, when the hand lever is raised as in Fig. 2, carrying the crosshead 10 upward and placing the upper ends of the members 11 and 12 adjacent the dies 8 and 9, in position to receive the core disks 15' and liners 15'' as they are cut from the web of liner material. After the stack carrying elements 11 and 12 are placed, the machine is started, the parts being so timed that at each reciprocation of the crosshead 5 the punches 6 and 7 simultaneously cut a core disk and a ring liner from the web and deposit each in their respective stack members. As the crosshead 5 recedes, the ratchet feed mechanism will advance the web of gasket or liner material equal to the center distance between the punches 6 and 7, thus placing the core opening, cut by punch 6, axially in alinement with punch 7, so that at the next down stroke of the crosshead 5, the punches 6 and 7 will cut a core disk and a ring liner and deposit each on the stack elements 11 and 12. This operation is repeated until the elements 11 and 12 are filled with liners and cores, when the machine is stopped by the operator, the stack units of liners and core pieces removed and empty stack containers replaced and the operation repeated. As the stack units are removed from the liner cutting machine they are preferably placed on suitably arranged transporting trucks (Figs. 10 to 12) where they can be temporarily stored or immediately conveyed to lining machines. In the storage and handling of can end liners by this method, mounted on portable stack cores, all liability to injury of the liners by reason of their delicacy of structure, flexibility and frangibility is obviated. By being assembled in superposed stack formation, a stack unit presents an object that can be almost roughly handled; they can be stood on end, or piled up in horizontal position one on top of the other without damage or mutilation to the thin ring liners, and when presented to the lining machines the stack units are inserted intact into the liner feed mechanism, so that single liners can be successively removed and deposited on can ends. The upper ends of the stack members or cores 11, form the lower ends of the stacks when they are inserted into the liner feed mechanism of the can end lining machines, and will operate in a manner to permit only one liner to be stripped therefrom at a time. Fig. 16 shows the manner of placing the stack units into a lining machine. A weight 11' serves to cause the liners to feed along the core 11 as liners are removed successively by the lining machine, through the operation of the feed mechanism. Feeding liners from a stack in this manner the feed mechanism may consist of a movable member 24 normally closing the mouth of the stack outlet, as it moves a recess 25 is axially alined with the liners (Fig. 16) when a single liner is admitted into the recess, and stripped off the lower end of the stack and thereby conveyed to a lining station (Fig. 17) where it is applied to a flanged can end. By utilizing the cutting elements to position the core disks and liners into stack formation, the delicate parts are mechanically controlled at all times, so that high cutting speed may be obtained and absolute certainty of continuous operation thereby assured.

In first starting a cut in the web of gasket material it will be necessary to only extend the web through to the core punch so that a core opening is presented to the ring liner die at its first cut, otherwise the web would be somewhat mutilated by the pilot 7' coming in contact therewith; in order to have the paper feed automatically during this first cutting a pair of narrow tapes could be pasted to the end of the paper that would span the die opening and yet draw the paper to the feed rolls. After the paper is once started and a roll is just finished, before the last end is allowed to pass out of the zone of the punches it is pasted to the end of the new roll so that there is always a web under the punches.

Referring to Figs. 15 to 20 inclusive, it is seen just how the individual stacks of liners are handled and maintained in a lining machine where single liners are removed from the stack, alined with can ends and applied to the flanges of the can ends. Before the stack cores 11 are inserted in the liner cutting machine as is shown by Fig. 3, a ring weight 11' is put on the core and rests on a shoulder 11''; the stack of cut liners rests on this weight as they are deposited on the core stack 11. As the stacks are removed from the machine a pin 11³ is placed through holes 11⁴ in the core 11, to hold the liners in place where the stack is inverted or handled in any manner. The stack units are inverted when put into the lining machines, the end that is lowermost in Fig. 3 is uppermost in Fig. 16, and is held by the clamp member 26, the pin 11³ serving to hold the liners on the core member when the stack is thus inverted. As soon as the stack core 11 is securely clamped the pin 11³ is removed when the weight 11'' will cause the liners to rest on the feed plate 24 and drop into the recess 25 when the liners and recess aline. Mounted adjacent the liner stack is an assembling plunger 27 and next to that a can end stack 28, a movable feed member 29 delivers single can ends into alinement with the plunger 27 (Fig. 17) at the same time the slide 24 feeds single liners into alinement therewith; suitable mechanism not shown then causes the plunger 27 to descend and place the liner onto the flange of the can end. After the liner and can end are assembled they are discharged as is shown in Fig. 18.

By reference to Figs. 13 and 14 it is more clearly seen just how the cutting dies operate in cutting core disks and liners and depositing them into stack formation. It is seen that the upper end of the stack core 11 rests concentrically with the ring die 9 so that as a ring is cut from the web or strip 15 it is immediately pushed down around the stack core 11 as is shown somewhat exaggerated in Fig. 14; at the same time a core disk is cut from the strip 15 and deposited in the stack chute 12. The disks 15' and rings 15'' are thus mechanically controlled from the instant they are separated from the web 15 until they are finally utilized for further operations.

Figs. 24 to 30 inclusive, show the method of cutting ring liners from the core pieces or disk blanks cut from the web or strip previously described. The only change in the machine to handle these disks automatically is in the feed mechanism. For simplicity of illustration and description I have assumed that the core disks as they are cut from the web are of the correct diameter from which to form other ring liners by simply cutting out the centers, thereby forming smaller core pieces and ring liners.

The stack carriers 12, when filled with core pieces, are taken from the machine, shown in Fig. 2, inverted and placed in the machine as shown in Figs. 24, 25, 26 and 30. The mechanism for feeding individual disks from the inverted delivering stacks consists of an intermittently rotatable feed disk or plate 30, mounted to rotate in a rocking feed ring 31; this feed ring is operated through the link 32, and pivoted lever 33, pivoted at 34. The lever 33 is operated from a link 35 and crank 36, the crank 36 being secured to the vertical drive shaft 37 and having continuous rotation. A pivoted lever 38 operated by a cam 39 on the shaft 37, serves to operate a locking and alining dog 40, which locks the feed disk 30 against rotation and alines the disk blanks fed thereby with the cutting punch 6.

The feed disk 30 is of thin sheet metal of practically the thickness of the disk blanks 15' and the inverted stack holder 12 rests directly on the feed disk 30. The feed disk 30 has preferably four orifices 30' (Fig. 27) of a diameter to just admit a disk blank at each step movement of the disk 30, the disk blank resting in the orifice directly under the stack of blanks, is stripped from the bottom of the stack and transported into alinement with the cutting punch 6, that is, from position $a$, Fig. 26 to position $b$; the disk blank at $b$ is perforated by the punch 6 and the core center pushed down through the die 8 into the underneath receiving stack carrier 12, the ring liner 15" remaining in the orifice 30' of the feed plate 30; at the next step movement of the feed plate 30 another disk blank is transported from position $a$ to position $b$ and the previously cut liner 15" in the orifice 30' at position $b$ is transported to position $c$, where it is pushed through the orifice die opening 9 onto the stack core 11, where a stack of ring liners is accumulated as the machine operates. It is necessary to operate the feed disk 30 with some precision as the orifice 30' must aline simultaneously at position $a$, $b$ and $c$. The mechanism for accomplishing this precision movement is operated from the vertical shaft 37, the continuous rotation of this shaft carrying the crank 36, oscillates the link 35, the lever 33, and link 32, thereby giving a rocking motion to the feed ring 31.

The feed ring 31 carries a pawl 31' (Fig. 28) that engages into recesses 30" around the edge of the feed plate 30. The edge of the feed plate 30 is reinforced with a ring $30^3$ (Figs. 28 and 29). During the rotary movement of the ring $30^3$ the locking dog 40 is drawn out of engagement with the disk 30, through the action of the cam 39 rotating with the shaft 37, and as soon as the feed plate 30 reaches an end of its step movement the dog 40 is instantly moved by the cam 39 and lever 30, into engagement with the ring $30^3$, secured to the disk 30, entering a wedge shaped opening 40' (Fig. 28) therein, thus locking and alining the feed plate 30 with the stations $a$, $b$ and $c$.

The inner end of the locking dog 40 is reduced in thickness and passes under the feed ring 31 (Fig. 29) and enters the wedge opening 40' in the lower side of the reinforcing ring $30^3$.

When operating on core disks the cutting punch 7 does no cutting but acts simply as a stripping punch, pushing the ring liner from the orifice 30' onto the stack carrier 11.

The handling of the empty stack carriers and when filled is the same as previously described where core centers and liners are cut from the web.

The machine illustrated and described, for carrying out my method, is only one of many different types of machines by which this method can be successfully practised, and I do not therefore show this type as the only one suitable nor do I wish to have my method confined to any particular type of machine.

This application relates to the method which is described and claimed, and I do not claim herein the apparatus; the apparatus for cutting and handling ring liners being claimed in my two applications, divisions hereof, filed August 28, 1920, Serial No. 406,670 and Serial No. 406,671; and the apparatus for assembling ring liners with can ends being claimed in my application, a division hereof, filed Aug. 28, 1920, Serial No. 406,672.

What is claimed is:—

1. The method of forming ring liners and the lining of flanged can ends, the same comprising the severing of ring liners from flat liner material, placing the cut ring liners in superposed axially alined stack formation, advancing flanged can ends relative to said stack of liners, and successively applying the liners from said stack to said can ends.

2. The method of forming ring liners and the lining of flanged can ends, the same comprising the severing of ring liners from thin flat and flexible liner material, placing the cut ring liners in superposed axially alined stack formation, advancing flanged can ends relative to said stack of liners, and successively removing the ring liners from the end of the stack and applying the liners so removed from said stack to said can ends.

3. A process of applying ring liners, which consists in cutting successive ring liners, assembling them into stack units, moving said units successively to a distributing station, and removing individual liners from a stack unit, and assembling said removed liners with can ends.

4. A process for applying ring liners to can ends for the sanitary hermetic closing of cans, which consists in cutting successive ring liners from thin and flat flexible material, such as paper, assembling the cut liners into stack units, moving said units successively to a distributing station, and removing individual liners successively and edgewise from the end of a stack unit, and assembling said removed liners with can ends.

5. A method of lining can ends for the sanitary hermetic closing of cans, which consists in cutting thin flexible ring liners from sheet material, such as paper, superposing said liners one on the other in stack formation and alining the same by means of the edges of their annular bodies, removing such stack to a distributing station, feeding said liners successively and edgewise from the end of the stack and restraining in position in the stack all of the liners, excepting the one so fed, by means of the edges of their annular bodies, and applying the liners so fed to can ends.

6. A method of lining can ends for the sanitary hermetic closing of cans, which consists in cutting thin flexible ring liners from sheet material, such as paper, superposing said liners one on the other in stack formation and alining the same by means of the edges of their annular bodies, removing such stack to a distributing station and inverting it, feeding said liners successively and edgewise from the bottom end of the stack and restraining in position in the stack all of the liners, excepting the one so fed, by means of the edges of their annular bodies, and applying the liners so fed to can ends.

7. A method of lining can ends for the sanitary hermetic closing of cans, which consists in cutting thin flexible ring liners from sheet material, such as paper, superposing said liners one on the other in stack formation and alining the same by means of the inner edges of their annular bodies, removing such stack to a distributing station and inverting it, feeding said liners successively and edgewise from the bottom end of the stack and restraining in position in the stack all of the liners, excepting the one so fed, by means of the inner edges of their annular bodies, and applying the liners so fed to can ends.

8. A method of lining can ends for the sanitary hermetic closing of cans, which consists in cutting thin flexible ring liners from sheet material, such as paper, superposing said liners one on the other in stack formation and alining the same by means of the edges of their annular bodies, removing such stack to a distributing station and inverting it, applying endwise pressure on said stack and causing said liners to be flattened into planes transverse to the stack, feeding said liners successively and edgewise from the end of the stack and restraining in position in the stack all of the liners, excepting the one so fed, by means of the edges of their annular bodies, and applying the liners so fed to can ends.

9. A method of making and caring for paper rings for lining can ends, which consists in cutting the liner rings flatwise from thin flat paper, delivering said cut rings flatwise against each other, centered in alinement and under pressure, to a holder where they are held firmly against each other, whereby distortion, disfigurement and injury of the fragile rings is prevented during subsequent handling.

10. A method of making and caring for paper rings for lining can ends, which consists in cutting the liner rings flatwise from thin flat paper, and delivering said cut rings arranged flatwise against each other to a holder where they are centered in alinement and held firmly against each other by endwise pressure, whereby distortion, disfigurement and injury of the fragile rings is prevented during subsequent handling.

11. A method of protecting ring liners during storage, consisting in arranging the liners superposed in axial alinement and stack formation, and holding the stacks under sufficient end pressure to cause the individual liners to reinforce each other and the edges of the liners which might otherwise be injured to constitute a substantially solid body and surface.

12. A method of preparing ring liners of thin flexible material for application to can ends for the sanitary hermetic closing of cans, consisting in arranging the liners superposed in axial alinement and stack formation, and holding the stacks under sufficient end pressure to cause the individual liners to flatten into transverse planes and reinforce each other, and the edges of the liners which might otherwise be injured to constitute a substantially solid body and surface, said stack being adapted to have the liners fed therefrom to can ends.

13. A method of preparing liners for application to can ends for the sanitary hermetic closing of cans, which consists in cutting thin flexible ring liners from sheet material, such as paper, superposing said liners one on the other in stack formation, and axially alining the annular bodies of the liners by means of their inner concave edges.

14. A continuous process for preparing thin paper ring liners to be fed from a stack of the same and applied to can ends, comprising successively cutting the ring liners from a relatively thin paper sheet, and guiding said liners by their interior marginal peripheries, successively as they are cut, into stack-arrangement and formation, the interior spaces of the liners being entirely filled and occupied by the guiding means so that the liners are accurately alined.

15. A continuous process for preparing thin paper ring liners to be fed from a stack of the same and applied to can ends, comprising successively cutting the cores of ring liners from a relatively thin paper sheet, then cutting the ring liners from said sheet and guiding said liners successively as they are cut into stack arrangement and formation by their interior marginal peripheries, the interior spaces of the liners being entirely filled and occupied by the guiding means so that the liners are accurately alined.

16. A continuous process for preparing thin paper ring liners to be fed from a stack of the same and applied to can ends, comprising successively cutting the cores of ring liners from a relatively thin paper sheet, then advancing the sheet, then cutting the ring liners from said sheet, and guiding said liners successively as they are cut into stack arrangement and formation by their interior marginal peripheries, the interior spaces of the liners being entirely filled and occupied by the guiding means so that the liners are accurately alined.

17. The herein described method of handling flexible can end liners or packing gaskets, which consists in assembling said liners in stack formation, then removing the endmost liners successively from the stack in a direction at right angles to the stack, whereby the stacked liners are caused to be moved progressively in an endwise direction, and then feeding said liners which have been removed from the stack successively in the same endwise direction, for application to a succession of can ends.

In testimony whereof I affix my signature.

CHARLES W. GRAHAM.